US008623512B2

(12) United States Patent
Pyun et al.

(10) Patent No.: US 8,623,512 B2
(45) Date of Patent: *Jan. 7, 2014

(54) ADHESIVE COMPOSITION FOR STEALTH DICING OF SEMICONDUCTOR, ADHESIVE FILM, AND SEMICONDUCTOR DEVICE INCLUDING THE ADHESIVE FILM

(75) Inventors: Ah Ram Pyun, Uiwang-si (KR); Jae Hyun Cho, Uiwang-si (KR); Ki Tae Song, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 95 days.

This patent is subject to a terminal disclaimer.

(21) Appl. No.: 12/970,045

(22) Filed: Dec. 16, 2010

(65) Prior Publication Data

US 2011/0152394 A1    Jun. 23, 2011

(30) Foreign Application Priority Data

Dec. 21, 2009  (KR) .................. 10-2009-0128327

(51) Int. Cl.
*B32B 27/38*  (2006.01)
*C08G 59/62*  (2006.01)
*C09J 163/00*  (2006.01)
*H01L 21/02*  (2006.01)

(52) U.S. Cl.
USPC ............... 428/413; 156/330; 438/33; 438/68; 525/523; 525/524

(58) Field of Classification Search
USPC .......... 156/327, 330, 332, 335; 428/413, 414; 438/33, 68; 523/427; 525/107, 109, 525/117, 119, 523, 524, 529, 530, 531, 532, 525/533
See application file for complete search history.

(56) References Cited

U.S. PATENT DOCUMENTS

| | | | |
|---|---|---|---|
| 7,863,758 B2 | 1/2011 | Jung et al. | |
| 2001/0022404 A1* | 9/2001 | Yamamoto et al. | 257/783 |
| 2006/0231801 A1 | 10/2006 | Carroll et al. | |
| 2007/0073008 A1* | 3/2007 | Hurley et al. | 525/523 |
| 2008/0063871 A1* | 3/2008 | Jung et al. | 428/414 |
| 2009/0104457 A1 | 4/2009 | Carroll et al. | |
| 2009/0120483 A1 | 5/2009 | Carroll et al. | |
| 2009/0301553 A1 | 12/2009 | Konno et al. | |
| 2009/0301554 A1 | 12/2009 | Konno et al. | |
| 2011/0006419 A1* | 1/2011 | Hirano | 257/737 |
| 2011/0160339 A1* | 6/2011 | Jeong et al. | 523/223 |
| 2011/0203659 A1 | 8/2011 | Carroll et al. | |

FOREIGN PATENT DOCUMENTS

| | | |
|---|---|---|
| CN | 101144000 | 3/2008 |
| CN | 101205444 | 6/2008 |
| CN | 101939825 A | 1/2011 |
| EP | 1713092 A2 | 10/2006 |
| WO | WO 2009099191 A1 * | 8/2009 ............ H01L 21/301 |

OTHER PUBLICATIONS

European Search Report in EP 10195259.6-1218, dated Mar. 27, 2012 (Pyun, et al.).
Chinese Office Action dated Jan. 29, 2013, and English Translation.
Chinese Office Action dated Mar. 5, 2013 and English Translation.

* cited by examiner

*Primary Examiner* — Michael J Feely
(74) *Attorney, Agent, or Firm* — Lee & Morse, P.C.

(57) ABSTRACT

An adhesive composition for stealth dicing of a semiconductor, an adhesive film, and a semiconductor device including the adhesive film, the adhesive composition including a polymer resin, the polymer resin having a glass transition temperature of about 5° C. to about 35° C., an epoxy resin, the epoxy resin including a liquid epoxy resin and a solid epoxy resin, a phenolic resin curing agent, an inorganic filler, a curing catalyst, and a silane coupling agent.

16 Claims, No Drawings

ADHESIVE COMPOSITION FOR STEALTH DICING OF SEMICONDUCTOR, ADHESIVE FILM, AND SEMICONDUCTOR DEVICE INCLUDING THE ADHESIVE FILM

BACKGROUND

1. Field

Embodiments relate to an adhesive composition for stealth dicing of a semiconductor, an adhesive film, and a semiconductor device including the adhesive film.

2. Description of the Related Art

With the trend toward smaller and highly integrated semiconductor devices, support members used in the semiconductor devices may also be smaller and finer. Silver pastes may be used to join semiconductor devices to each other and/or to join semiconductor devices to support members. The use of such silver pastes has many drawbacks, including protrusion, imperfect wire bonding attributed to the inclination of semiconductor devices, formation of bubbles and difficulty in thickness control. For these reasons, there is a growing tendency to use adhesive films in place of silver pastes.

Adhesive films for semiconductor assembly may be used together with dicing films. The dicing films may be films that are used to fix semiconductor wafers during dicing. Dicing may be a process in which a semiconductor wafer is cut into individual chips. Expansion, pick-up, and mounting processes may be sequentially carried out after dicing.

SUMMARY

Embodiments are directed to an adhesive composition for stealth dicing of a semiconductor, an adhesive film, and a semiconductor device including the adhesive film.

The embodiments may be realized by providing an adhesive composition for stealth dicing of a semiconductor, the adhesive composition including a polymer resin, the polymer resin having a glass transition temperature of about 5° C. to about 35° C., an epoxy resin, the epoxy resin including a liquid epoxy resin and a solid epoxy resin, a phenolic resin curing agent, an inorganic filler, a curing catalyst, and a silane coupling agent.

The adhesive composition may include about 100 parts by weight of the polymer resin, about 1 to about 20 parts by weight of the epoxy resin, about 1 to about 20 parts by weight of the phenolic resin curing agent, about 10 to about 80 parts by weight of the inorganic filler, about 0.1 to about 20 parts by weight of the curing catalyst, and about 0.1 to about 10 parts by weight of the silane coupling agent.

The liquid epoxy resin may be present in an amount of about 5 to about 40% by weight, based on a total weight of the epoxy resin.

The polymer resin may have a weight average molecular weight of about 50,000 to about 5,000,000 g/mol.

The polymer resin may include at least one of a polyester resin, a polyamide resin, a butadiene rubber, an acrylic rubber, a (meth)acrylate resin, a urethane resin, a polyphenylene ether resin, a polyetherimide resin, a phenoxy resin, a modified polyphenylene ether resin, and a (meth)acrylate copolymer containing epoxy groups.

The liquid epoxy resin may include at least one of a bisphenol A epoxy resin, a bisphenol F epoxy resin, a tri- or higher functional epoxy resin, a rubber modified epoxy resin, a urethane modified epoxy resin, an acrylic modified epoxy resin, and a photosensitive epoxy resin.

The solid epoxy resin may include at least one of a bisphenol epoxy resin, a phenol novolac epoxy resin, an o-cresol novolac epoxy resin, a polyfunctional epoxy resin, an amino epoxy resin, a heterocyclic ring-containing epoxy resin, a substituted epoxy resin, a naphthol epoxy resin, and derivatives thereof.

The phenolic resin curing agent may include at least one of a bisphenol resin, a phenol novolac resin, a bisphenol A novolac resin, a phenolic resin, and mixtures thereof.

The inorganic filler may include at least one of gold powder, silver powder, copper powder, nickel, alumina, aluminum hydroxide, magnesium hydroxide, calcium carbonate, magnesium carbonate, calcium silicate, magnesium silicate, calcium oxide, magnesium oxide, aluminum nitride, silica, boron nitride, titanium dioxide, a glass, iron oxide, and a ceramic.

The curing catalyst may include at least one of a melamine catalyst, an imidazole catalyst, and a triphenylphosphine catalyst.

The silane coupling agent may include at least one of an epoxy-containing silane including at least one of 2-(3,4-epoxycyclohexyl)ethyltrimethoxysilane, 3-glycidoxytrimethoxysilane, and 3-glycidoxypropyltriethoxysilane; an amine-containing silane including at least one of N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, and N-phenyl-3-aminopropyltrimethoxysilane; a mercapto-containing silane including at least one of 3-mercaptopropylmethyldimethoxysilane and 3-mercaptopropyltriethoxysilane; and an isocyanate-containing silane including 3-isocyanatopropyltriethoxysilane.

The adhesive composition may further include about 20 to about 500 parts by weight of an organic solvent, based on 100 parts by weight of the polymer resin.

The adhesive composition may further include about 0.01 to about 10 parts by weight of at least one ion scavenger, based on 100 parts by weight of the polymer resin, the ion scavenger including at least one of a triazine thiol compound, a zirconium compound, an antimony bismuth compound, and a magnesium aluminum compound.

The adhesive composition may provide an adhesive having an elastic modulus at about 0° C. of about 1,500 to about 2,500 MPa before curing and an elastic modulus at about 175° C. of about 1.5 to about 2.5 MPa after curing.

The liquid epoxy resin may have a melting point of about −70° C. to about 0° C., and the solid epoxy resin may have a softening point of about 30° C. to about 100° C.

The embodiments may also be realized by providing an adhesive film for stealth dicing of a semiconductor formed from the adhesive composition of an embodiment.

The adhesive film may have an elastic modulus at about 0° C. of about 1,500 to about 2,500 MPa before curing and an elastic modulus at about 175° C. of about 1.5 to about 2.5 MPa after curing.

The embodiments may also be realized by providing a semiconductor device including the adhesive film of an embodiment.

Less than about 5% of an area of the adhesive film may be covered by attach voids or molding voids.

DETAILED DESCRIPTION

Korean Patent Application No. 10-2009-0128327, filed on Dec. 21, 2009, in the Korean Intellectual Property Office, and entitled: "Adhesive Composition for Stealth Dicing of Semiconductor, Adhesive Film Using the Adhesive Composition and Semiconductor Device Comprising the Adhesive Film," is incorporated by reference herein in its entirety.

Example embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Dicing methods may include, e.g., a stealth dicing method in which a laser is concentrated inside a wafer to selectively form processed portions and a physical tension is applied to individualize the wafer together with an underlying adhesive layer along the lines of the processed portions at a low temperature of about −10 to about 0° C.; and a dicing method in which a wafer is partially cut using a diamond blade, an adhesive film is attached thereto, and a physical tension is applied to individualize the wafer together with the adhesive film along the cut lines at a low temperature of about −10 to about 0° C.

The adhesive composition according to an embodiment may include, e.g., (a) a polymer resin having a glass transition temperature of about 5° C. to about 35° C., (b) an epoxy resin including a liquid epoxy resin and a solid epoxy resin, (c) a phenolic resin as a curing agent, (d) an inorganic filler, (e) a curing catalyst, and (f) a silane coupling agent.

(a) Polymer Resin

The polymer resin may have a glass transition temperature Tg of about 5 to about 35° C. Maintaining the Tg at about 5 to about 35° C. may help increase a low-temperature elastic modulus of an adhesive prepared using the adhesive composition prior to curing and may help decrease a high-temperature elastic modulus of the adhesive after curing. Maintaining the glass transition temperature at about 5° C. or greater may help ensure that the adhesive prepared using the adhesive composition does not have an excessively high flowability. Avoiding such a high flowability may prevent a decrease in the low-temperature elastic modulus of the adhesive and may prevent poor heat resistance of the adhesive, even though high flowability may make the adhesive embeddable in a substrate to improve the ability to remove voids. Maintaining the low-temperature elastic modulus may help ensure that the adhesive prepared using the adhesive composition is divisible at low temperature and maintaining the heat resistance may help ensure sufficient high-temperature adhesive strength and reliability. Maintaining the Tg at about 35° C. or less may help ensure that an adhesive prepared from the adhesive composition exhibits sufficient ability to remove voids. The polymer resin preferably has a glass transition temperature of about 5 to about 25° C. and more preferably about 7 to about 20° C.

In an embodiment, the polymer resin (a) may have a weight average molecular weight Mw of about 50,000 to about 5,000,000 g/mol, and preferably about 100,000 to about 1,000,000 g/mol. Maintaining the Mw at about 50,000 to about 5,000,000 g/mol may facilitate film formation and may help ensure excellent mechanical properties.

The polymer resin may include, e.g., polyester resins, polyamide resins, butadiene rubbers, acrylic rubbers, (meth) acrylate resins, urethane resins, polyphenylene ether resins, polyetherimide resins, phenoxy resins, modified polyphenylene ether resins, and/or (meth)acrylate copolymers containing epoxy groups. These polymer resins may be used alone or as a mixture of two or more thereof. In an implementation, the polymer resin (a) may include, e.g., a polymer formed from one or more functional monomers, such as glycidyl acrylate or glycidyl methacrylate, for example, a (meth) acrylic copolymer containing epoxy groups.

(b) Epoxy Resin

The epoxy resin may function as an adhesive when cured. The epoxy resin may include, e.g., both (b1) a liquid epoxy resin and (b2) a solid epoxy resin. The presence of the liquid epoxy resin (b1) may reduce a viscosity of an adhesive prepared using the adhesive composition with increasing temperature from room temperature to achieve good embedding of the adhesive in a substrate, thereby resulting in an improvement in the ability to remove voids.

Any suitable epoxy resin that is a liquid at room temperature may be used as the liquid epoxy resin (b1). In an implementation, the liquid epoxy resin may have a melting point ($T_m$) of about −70 to about 0° C. and preferably about −50 to about −10° C.

The liquid epoxy resins may include, e.g., bisphenol A epoxy resins, bisphenol F epoxy resins, tri- or higher functional epoxy resins, rubber modified epoxy resins, urethane modified epoxy resins, acrylic modified epoxy resins, and/or photosensitive epoxy resins. These liquid epoxy resins may be used alone or as a mixture of two or more thereof. Of these, bisphenol A epoxy resins are preferred.

The liquid epoxy resin (b1) may have an epoxy equivalent weight of about 100 to about 1,500 g/eq., preferably about 150 to about 800 g/eq., and most preferably about 150 to about 400 g/eq. Maintaining the epoxy equivalent weight of the liquid epoxy resin at about 100 to about 1,500 g/eq may help ensure good adhesiveness of an adhesive formed from the adhesive composition after curing and high heat resistance of the adhesive while maintaining the glass transition temperature of the adhesive.

The liquid epoxy resin (b1) may have a weight average molecular weight Mw of about 100 to about 1,000 g/mol. Maintaining the Mw at about 100 to about 1,000 g/mol may help ensure that good flowability of an adhesive prepared using the adhesive composition is attained.

The solid epoxy resin (b2) may be in a solid state or a state close to a solid at room temperature and may include one or more functional groups.

In an implementation, the solid epoxy resin (b2) may have a softening point (Sp) of about 30 to about 100° C. and preferably about 50 to about 80° C.

The solid epoxy resin may include, e.g., bisphenol epoxy resins, phenol novolac epoxy resins, o-cresol novolac epoxy resins, polyfunctional epoxy resins, amino epoxy resins, heterocyclic ring-containing epoxy resins, substituted epoxy resins, naphthol epoxy resins, and/or derivatives thereof. These solid epoxy resins may be used alone or as a mixture of two or more thereof. Of these, cresol novolac epoxy resins are preferred.

The solid epoxy resin may include a commercially available solid epoxy resin, e.g., bisphenol epoxy resins, such as YD-017H, YD-020, YD020-L, YD-014, YD-014ER, YD-013K, YD-019K, YD-019, YD-017R, YD-017, YD-012, YD-011H, YD-011S, YD-011, YDF-2004 and YDF-2001 (Kukdo Chemical Co., Ltd.); phenol novolac epoxy resins, such as EPIKOTE 152 and EPIKOTE 154 (Yuka Shell Epoxy Co., Ltd.), EPPN-201 (Nippon Kayaku Co., Ltd.), DN-483 (Dow Chemical), and YDPN-641, YDPN-638A80, YDPN-638, YDPN-637, YDPN-644 and YDPN-631 (Kukdo Chemical Co., Ltd.); o-cresol novolac epoxy resins, such as YDCN-500-1P, YDCN-500-2P, YDCN-500-4P, YDCN-500-5P, YDCN-500-7P, YDCN-500-8P, YDCN-500-10P, YDCN-500-80P, YDCN-500-80PCA60, YDCN-500-80PBC60, YDCN-500-90P and YDCN-500-90PA75 (Kukdo Chemical Co., Ltd.), EOCN-102S, EOCN-1035, EOCN-104S, EOCN-1012, EOCN-1025 and EOCN-1027 (Nippon Kayaku Co., Ltd.), YDCN-701, YDCN-702, YDCN-703 and YDCN-704 (Tohto Kasei Co., Ltd.), and EPICLON N-665-EXP (Dainippon Ink & Chemicals, Inc.); bisphenol novolac epoxy resins, such as KBPN-110, KBPN-120 and KBPN-115 (Kukdo Chemical Co., Ltd.); polyfunctional epoxy resins, such as EPON 1031S (Yuka Shell Epoxy Co., Ltd.), Araldite 0163 (Ciba Specialty Chemicals), DENACOL EX-611, DENACOL EX-614, DENACOL EX-614B, DENACOL EX-622, DENACOL EX-512, DENACOL EX-521, DENACOL EX-421, DENACOL EX-411 and DENACOL EX-321 (Nagase ChemteX Corp.), and EP-5200R, KD-1012, EP-5100R, KD-1011, KDT-4400A70, KDT-4400, and YH-434L, YH-434 and YH-300 (Kukdo Chemical Co., Ltd.); amino epoxy resins, such as EPIKOTE 604 (Yuka Shell Epoxy Co., Ltd.), YH-434 (Tohto Kasei Co., Ltd.), TETRAD-X and TETRAD-C (Mitsubishi Gas Chemical Co., Inc.), and ELM-120 (Sumitomo Chemical Co., Ltd.); heterocyclic ring-containing epoxy resins, such as PT-810 (Ciba Specialty Chemicals); substituted epoxy resins, such as ERL-4234, ERL-4299, ERL-4221 and ERL-4206 (UCC); and naphthol epoxy resins, such as EPICLON HP-4032, EPICLON HP-4032D, EPICLON HP-4700 and EPICLON 4701 (Dainippon Ink & Chemicals, Inc.). These solid epoxy resins may be used alone or as a mixture of two or more thereof.

The epoxy resin (b) may be present in an amount of about 1 to about 20 parts by weight, based on 100 parts by weight (solid content) of the polymer resin (a). Maintaining the amount of the epoxy resin (b) at about 1 part by weight or greater may help ensure that the epoxy resin (b) is able to be cured completely, thereby ensuring sufficient reliability. Maintaining the amount of the epoxy resin (b) in an amount of about 20 parts by weight or less may prevent a drop in tensile strength of an adhesive film formed using the adhesive composition. The epoxy resin (b) is more preferably present in an amount of about 5 to about 18 parts by weight and most preferably about 10 to about 16 parts by weight, based on 100 parts by weight (solid content) of the polymer resin (a).

The liquid epoxy resin (b1) may be present in an amount of about 5 to about 40% by weight and more preferably about 20 to about 30% by weight, based on a total weight of the epoxy resin (b). Maintaining the amount of the liquid epoxy resin at about 5 to about 40% by weight may maximize the ability of an adhesive prepared using the adhesive composition to remove voids without adversely affecting the viscosity and elastic modulus of the adhesive. For example, a viscosity drop of the adhesive may be attained when the liquid epoxy resin (b1) is combined with the polymer resin (a) having a glass transition temperature of about 5° C. to about 35° C.

(c) Phenolic resin curing agent

The phenolic resin curing agent is not particularly limited. Any suitable phenolic resin curing agent may be used. In an implementation, the phenolic resin curing agent may be a compound that has two or more phenolic hydroxyl groups per molecule. The phenolic resin curing agent may include, e.g., bisphenol resins, such as bisphenol A, bisphenol F and bisphenol S resins, phenol novolac resins, bisphenol A novolac resins, xyloc resins, cresol novolac resins, and biphenyl resins, all of which are highly resistant to electrolytic corrosion upon moisture absorption.

In an implementation, the phenolic resin curing agent may have a hydroxyl equivalent weight of about 100 to about 600 g/eq. and preferably about 170 to about 300 g/eq. Maintaining the hydroxyl equivalent weight at about 100 to about 600 g/eq may help ensure that appropriate moisture absorption and flowability of an adhesive prepared using the adhesive composition can be maintained and may prevent a decrease in the glass transition temperature of the adhesive, thereby ensuring good heat resistance of the adhesive.

The phenolic resin curing agent may include a currently commercially available product, e.g., simple phenolic curing agents such as: H-1, H-4, HF-1M, HF-3M, HF-4M and HF-45 (Meiwa Plastic Industries, Ltd.); para-xylene curing agents, such as MEH-78004S, MEH-7800SS, MEH-7800S, MEH-7800M, MEH-7800H, MEH-7800HH and MEH-78003H (Meiwa Plastic Industries, Ltd.), and KPH-F3065 (Kolon Chemical Co., Ltd.); biphenyl curing agents, such as MEH-7851SS, MEH-7851S, MEH7851M, MEH-7851H, MEH-78513H and MEH-78514H (Meiwa Plastic Industries, Ltd.), and KPH-F4500 (Kolon Chemical Co., Ltd.); and triphenylmethyl curing agents, such as MEH-7500, MEH-75003S, MEH-7500SS, MEH-7500S and MEH-7500H (Meiwa Plastic Industries, Ltd.). These phenolic resin curing agents may be used alone or as a mixture of two or more thereof.

The phenolic resin curing agent (c) may be present in an amount of about 1 to about 20 parts by weight, based on 100 parts by weight of the polymer resin (a). Maintaining the amount of the phenolic resin curing agent (c) at about 1 part by weight or greater may help ensure complete curing of an adhesive prepared using the adhesive composition, thereby preventing a deterioration in reliability. Maintaining the amount of the phenolic resin curing agent (c) at about 20 parts by weight or less may prevent a drop in the tensile strength of an adhesive film formed using the adhesive composition. The phenolic resin curing agent (c) may be more preferably present in an amount of about 3 to about 15 parts by weight and most preferably about 5 to about 12 parts by weight, based on 100 parts by weight of the polymer resin (a).

(d) Inorganic Filler

The inorganic filler may include, e.g., a metal, a metal oxide, a metal nitride, a metal hydroxide, a metal salt, a glass, or a ceramic. Examples of suitable inorganic fillers for the preparation of the adhesive composition may include, but are not necessarily limited to, gold powder, silver powder, copper powder, nickel, alumina, aluminum hydroxide, magnesium hydroxide, calcium carbonate, magnesium carbonate, calcium silicate, magnesium silicate, calcium oxide, magnesium oxide, aluminum oxide, aluminum nitride, silica, boron nitride, titanium dioxide, glass, iron oxide and ceramics. These inorganic fillers may be used alone or as a mixture of two or more thereof. Of these, silica is preferred.

There is no particular restriction as to a shape and a size of the inorganic filler. The inorganic filler may have a size of about 5 nm to about 20 μm and may be spherical, amorphous or flake-like in shape. A mixture of spherical and amorphous inorganic fillers is preferably used.

The inorganic filler may be present in an amount of about 10 to about 80 parts by weight, based on 100 parts by weight of the polymer resin (a). Maintaining the amount of the inorganic filler (d) at about 10 parts by weight or greater may help ensure that the inorganic filler contributes to improvement in the low-temperature divisibility of an adhesive prepared using the adhesive composition. Maintaining the amount of the inorganic filler (d) at about 80 parts by weight or less may help facilitate film formation and may prevent deterioration of the adhesion of the adhesive to an adherend. The inorganic filler is more preferably present in an amount of about 20 to about 70 parts by weight and most preferably about 30 to 65 parts by weight, based on 100 parts by weight of the polymer resin (a).

(e) Curing Catalyst

The curing catalyst may be added to, e.g., shorten a time taken for the epoxy resins to be completely cured during semiconductor processing.

The curing catalyst is not particularly limited. Examples of suitable curing catalysts may include melamine, imidazole, and triphenylphosphine catalysts. These catalysts may be used alone or as a mixture of two or more thereof.

Examples of currently commercially available products for the curing catalyst may include imidazole catalysts, such as PN-23, PN-40 (Ajinomoto Fine-Techno Co. Inc.), 2P4MZ, 2MA-OK, 2MAOK-PW and 2P4 MHZ (Shikoku Chemicals Corp.), and TPP-K and TPP-MK (Hokko Chemical Industry Co. Ltd.).

The curing catalyst may be present in an amount of about 0.1 to about 20 parts by weight, based on 100 parts by weight of the polymer resin (a). Maintaining the amount of the curing catalyst at about 0.1 parts by weight or greater may help prevent insufficient cross-linking of the epoxy resin, thereby preventing a deterioration in heat resistance. Maintaining the amount of the curing catalyst at about 20 parts by weight or less may help ensure stability of the adhesive composition or an adhesive prepared therefrom during storage. The curing catalyst is preferably present in an amount of about 1 to about 15 parts by weight, based on 100 parts by weight of the polymer resin (a).

(f) Silane Coupling Agent

The silane coupling agent may function as an adhesion enhancer that induces formation of chemical bonds between inorganic materials (e.g., silica) and organic materials upon blending to enhance the adhesive strength of an adhesive prepared using the adhesive composition.

The coupling agent may include, e.g., epoxy-containing silanes, such as 2-(3,4-epoxycyclohexyl)ethyltrimethoxysilane, 3-glycidoxytrimethoxysilane, and 3-glycidoxypropyltriethoxysilane; amine-containing silanes, such as N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, and N-phenyl-3-aminopropyltrimethoxysilane; mercapto-containing silanes, such as 3-mercaptopropylmethyldimethoxysilane and 3-mercaptopropyltriethoxysilane; and isocyanate-containing silanes, such as 3-isocyanatopropyltriethoxysilane. These silane coupling agents may be used alone or as a mixture of two or more thereof.

The coupling agent may be present in an amount of about 0.1 to about 10 parts by weight, based on 100 parts by weight of the polymer resin (a). Maintaining the amount of the coupling agent at about 0.1 to about 10 parts by weight may help prevent deterioration of adhesion reliability of an adhesive prepared using the adhesive composition. Maintaining the amount of the coupling agent at about 10 parts by weight or less may help prevent the occurrence of bubbles after die attach.

The adhesive composition may further include an organic solvent. The organic solvent may lower the viscosity of the adhesive composition in order to facilitate formation of a film. The organic solvent may include, e.g., toluene, xylene, propylene glycol monomethyl ether acetate, benzene, acetone, methyl ethyl ketone, tetrahydrofuran, dimethylformaldehyde, and/or cyclohexanone. In an implementation, the organic solvent may include a mixture of a solvent having a relatively low boiling point of, e.g., about 40 to about 125° C., and a solvent having a relatively high boiling point of, e.g., about 140 to about 200° C. The use of the mixed solvent may contribute to the removal or prevention of voids and an increase in reliability. The low boiling point solvent and the high boiling point solvent may be mixed in a ratio of about 1:0.7 to about 1:4. Maintaining the mixing ratio at about 1:0.7 to about 1:4 may help ensure that volume expansion of interfacial gaps and voids are suppressed, thereby minimizing the formation of voids at the interfaces with chips. At the same time, volume expansion of gaps and voids during wire filling may be suppressed, thereby achieving high reliability of an adhesive film to be formed using the adhesive composition.

The organic solvent may be present in an amount of about 20 to about 500 parts by weight and preferably about 100 to about 300 parts by weight, based on 100 parts by weight of the polymer resin.

The adhesive composition may further include an ion scavenger. The ion scavenger may adsorb ionic impurities and may help ensure high insulation reliability upon moisture absorption.

The ion scavenger may include, e.g., triazine thiol compounds, zirconium compounds, antimony bismuth compounds, and magnesium aluminum compounds. The ion scavenger may be included in an amount of about 0.01 to about 10 parts by weight, and preferably between about 0.1 and about 5 parts by weight, with respect to 100 parts by weight of the polymer resin (a). Maintaining the amount of the ion scavenger at about 10 parts by weight or less may prevent the ion scavenger from acting as an impurity, which may be economically disadvantageous.

Another embodiment provides an adhesive film for stealth dicing of a semiconductor wherein the adhesive film is formed from the adhesive composition according to an embodiment.

The adhesive film may be formed by application of the adhesive composition of the previous embodiment. For example, the adhesive film may be produced by coating the adhesive composition on a base film to form an adhesive layer followed by drying and curing of the adhesive layer. In an implementation, the adhesive layer may be dried at about 80 to about 120° C. for about 10 to about 60 min.

The adhesive layer may be cured at about 120 to about 150° C. for about 1 to about 10 hr. In an implementation, the adhesive layer may be cured by repeating a curing cycle of about 1 to about 3 hr at about 120° C. to about 130° C. (first curing) and 10 to about 60 min at about 130° C. to about 150° C. (second curing). The curing cycle may be repeated about one to about eight times.

The adhesive film may have an elastic modulus at about 0° C. before curing of about 2,000 to about 2,500 MPa and preferably about 2,100 to about 2,450 MPa. The adhesive film may have an elastic modulus at about 175° C. after curing of about 1.5 to about 2.5 MPa and preferably about 1.5 to about 2.3 MPa. Attach voids and molding voids may cover less than about 5% of the area of the adhesive film. The increased low-temperature elastic modulus before curing may make the adhesive film more divisible by low-temperature expansion after stealth dicing and may improve flowability of the adhesive film at room to higher temperatures, thereby improving the ability to remove or prevent bubbles for a wafer. In addition, the decreased elastic modulus after curing may improve the ability to remove bubbles and may achieve improved adhesion reliability.

Another embodiment provides a semiconductor device including the adhesive film. The semiconductor device may be formed from a structure in which the adhesive film is adhered to a semiconductor wafer. In an implementation, the adhesive film may be laminated to a dicing film; and the semiconductor wafer may be attached to the adhesive film. The wafer may be cut into pieces by stealth dicing. The adhesive film may also be used to stack semiconductor chips.

As described above, the adhesive composition may provide an adhesive having increased elastic modulus at low temperature before curing and decreased elastic modulus at high temperature after curing. The increased low-temperature elastic modulus before curing may facilitate individualization of the adhesive film at low temperature and may facilitate cutting of the adhesive film. The decreased high-temperature elastic modulus after curing may help ensure good embedding in a substrate and high adhesion reliability. In addition, the adhesive film may facilitate the individualization of the wafer by expansion at a low temperature (−10 to 0° C.) after an inner portion of the wafer is partially processed by laser stealth dicing.

Hereinafter, the constitution and functions of the present invention will be explained in more detail with reference to the preferred embodiments of the present invention. The following examples are provided to assist in a further understanding of the invention and are in no way intended to limit the scope of the invention. Embodiments that are not included herein will be readily recognized and appreciated by those skilled in the art, and thus their explanation is omitted. The following examples and experiments are given for illustrative purposes only and are not intended to limit the scope of this disclosure. Moreover, the Comparative Examples are set forth to highlight certain characteristics of certain embodiments and are not to be construed as either limiting the scope of the invention as exemplified in the Examples or as necessarily always being outside the scope of the invention in every respect.

EXAMPLES

The following components were used to prepare adhesive compositions in Examples 1-4 and Comparative Examples 1-6:
(a) Polymer resin
(a1) KLS-1046DR, $T_g$: 38° C., solid content: 20%, Fujikura Kasei Co., Ltd.
(a2) KLS-1062DR, $T_g$: 16° C., solid content: 20%, Fujikura Kasei Co., Ltd.
(a3) SG-PT-85, $T_g$: 7° C., solid content: 15%, Nagase
(a4) SG-PT-31, $T_g$: 0° C., solid content: 15%, Nagase
(b) Epoxy resin
(b1) Liquid epoxy resin: Bisphenol A epoxy resin (YD-128, Kukdo Chemical Co., Ltd.)
(b2) Solid epoxy resin: Cresol novolac epoxy resin (YDCN-500-10P, Kukdo Chemical Co., Ltd.)
(c) Phenolic resin curing agent: Phenol novolac epoxy resin (HF-4M, Meiwa Plastic Industries Ltd.)
(d) Inorganic filler
(d1) Spherical silica (SC-2500SQ, Admatechs)
(d2) Amorphous silica (A200, Degussa)
(e) Curing catalyst: Phosphine catalyst (TPP-MK, Meiwa Plastic Industries Ltd.)
(f) Silane coupling agent: Epoxy silane (KBM-303, Shinetsu Chemical Co., Ltd.)
(g) Solvent: Cyclohexanone (CCH, Samchun Chemical)

Examples 1-4 and Comparative Example 1-6

Production of Adhesive Films

The components and amounts shown in Table 1 were introduced into a one-liter beaker equipped with a high-speed stirring bar and dispersed at a low speed of 2,000 rpm for 10 min and a high speed of 5,000 rpm for 30 min to prepare an adhesive composition. Then, the adhesive composition was filtered through a 50 μm capsule filter and coated to a thickness of 20 μm using an applicator to form an adhesive layer. The adhesive layer was sequentially dried at 90° C. for 10 min and 110° C. for 5 min and was then stored at room temperature for 1 day.

TABLE 1

|  |  | Example No. | | | | Comparative Example No. | | | | | |
| --- | --- | --- | --- | --- | --- | --- | --- | --- | --- | --- | --- |
|  |  | 1 | 2 | 3 | 4 | 1 | 2 | 3 | 4 | 5 | 6 |
| (a) Polymer resins | (a1) | — | — | — | — | 125 | 125 | — | — | — | — |
|  | (a2) | 125 | 125 | — | — | — | — | — | — | 125 | — |
|  | (a3) | — | — | 166.7 | 166.7 | — | — | — | — | — | 166.7 |
|  | (a4) | — | — | — | — | — | — | 166.7 | 166.7 | — | — |
| (b) Epoxy resin | (b1) | 1.5 | 3 | 1.5 | 3 | 1.5 | 3 | 1.5 | 3 | — | — |
|  | (b2) | 3 | 1.5 | 3 | 1.5 | 3 | 1.5 | 3 | 1.5 | 4.5 | 4.5 |
| (c) Phenolic epoxy resin |  | 2.5 | 2.5 | 2.5 | 2.5 | 2.5 | 2.5 | 2.5 | 2.5 | 2.5 | 2.5 |
| (d) Inorganic filler | (d1) | 12.5 | 12.5 | 12.5 | 12.5 | 12.5 | 12.5 | 12.5 | 12.5 | 12.5 | 12.5 |
|  | (d2) | 2.5 | 2.5 | 2.5 | 2.5 | 2.5 | 2.5 | 2.5 | 2.5 | 2.5 | 2.5 |
| (e) Curing catalyst |  | 2.5 | 2.5 | 2.5 | 2.5 | 2.5 | 2.5 | 2.5 | 2.5 | 2.5 | 2.5 |
| (f) Silane coupling agent |  | 0.5 | 0.5 | 0.5 | 0.5 | 0.5 | 0.5 | 0.5 | 0.5 | 0.5 | 0.5 |
| (g) Solvent |  | 50 | 50 | 50 | 50 | 50 | 50 | 50 | 50 | 50 | 50 |

The physical properties of the adhesive films prepared according to Examples 1-4 and Comparative Examples 1-6 were evaluated by the following methods. The results are shown in Table 2, below.

Divisibility of the adhesive films at low temperature was judged based on elastic modulus values at 0° C. The adhesive films of Examples 1-4 having elastic modulus values (E') above 2,000 were sufficiently elastic to be divided at 0° C. In contrast, the adhesive films of Comparative Examples 3 and 4 having elastic modulus values below 2,000 were not sufficiently elastic to be divided at 0° C. The ability of the adhesive films to remove attach voids and the ability of the adhesive films to remove molding voids were judged based on the melt viscosity values before curing and the elastic modulus values after curing, respectively. Depending on the melt viscosity and the elastic modulus values, it was determined whether the respective physical properties were good or not.

Details of the experimental methods are as follows:

(1) Melt viscosity before curing: 20 sheets of each of the films were laminated together at 60° C. A circular portion (diameter=8 mm) was cut out from the laminate so as to have a thickness of about 400 to about 450 µm. The viscosity (η) of the sample was measured at 30-130° C. while raising the temperature at a rate of 5° C./min. η indicates the flowability of the film at a temperature (60° C.) for wafer mounting and a temperature (120° C.) for die attach after pick-up. The results are presented in Table 2, below.

(2) Elastic modulus before curing: 20 sheets of each of the films were laminated together at 60° C. The laminate was cut into a sample having a size of 7.0 mm×15 mm and a thickness of about 400 to about 450 µm. The elastic modulus of the sample was measured at a frequency of 10 Hz while heating from −30 to 150° C. at a rate of 4° C./min. Measurement was conducted using a dynamic mechanical analyzer (DMA) (Q800, TA). The low-temperature divisibility was judged based on the elastic modulus of the adhesive film at 0° C. The results are presented in Table 2.

(3) Elastic modulus after curing: 20 sheets of each of the films were laminated together at 60° C. and completely cured at 175° C. for 2 hr. The laminate was cut into a sample having a size of 7.0 mm×15 mm and a thickness of about 400 to about 450 µm. The elastic modulus of the sample was measured at a frequency of 10 Hz while heating the temperature from −30 to 300° C. at a rate of 4° C./min. Measurement was conducted using a dynamic mechanical analyzer (DMA) (Q800, TA). The elastic modulus of the sample at 175° C. indicates the ability of the adhesive composition to remove molding voids after curing and the adhesion reliability of the adhesive composition. The results are presented in Table 2, below.

(4) Adhesive strength: A 725 µm thick wafer coated with a dioxide film was cut into chips having a size of 5 mm×5 mm. The chips were laminated to each of the adhesive films at 60° C. The laminate was cut such that only the adhered portions remained. After a 725 µm thick wafer having a size of 10 mm×10 mm was placed on a hot plate at 120° C., the wafer pieces, to which the adhesive film was laminated, were pressed thereon under a load of 1.0 kgf for 1.0 sec, followed by curing at 125° C. for 1 hr and at 175° C. for 2 hr. After the resulting specimen was allowed to stand under PCT conditions (121° C./100% RH) for 8 hours, IR-reflow was performed three times. The shear strength of the specimen was measured at 250° C.

(5) Low-temperature divisibility: Each of the adhesive films produced in Examples 1-4 and Comparative Examples 1-6 was laminated over a large area on a dicing tape and allowed to stand for 1 day. The laminate was laminated to a 50 µm thick wafer and mounted on a ring frame. The central portion (30 µm) of the wafer was processed using a laser to form processed portions. The wafer was diced into chips having a size of 10 mm×10 mm. Wafer ring expansion was conducted on the chips at a fixed temperature of 0° C. The low-temperature divisibility of the adhesive film was evaluated depending on whether the wafer pieces were well divided or not.

(6) Measurement of voids: A 725 µm thick wafer coated with a dioxide film was cut into chips having a size of 5 mm×5 mm. The chips were laminated to each of the adhesive films at 60° C. The laminate was cut such that only the adhered portions remained. After a 1 mm thick printed circuit board (PCB) having a size of 10 mm×10 mm was placed on a hot plate at 100° C., the wafer pieces, to which the adhesive film was laminated, were pressed at a load of 1.0 kgf for 1.0 sec. A scanning acoustic tomograph (SAT) was used to evaluate the level of attach voids. Thereafter, the specimen was cured at 125° C. for 4 hr and pressurized under a load of 1 MPa at 175° C. for 18 sec. A scanning acoustic tomograph (SAT) was used to evaluate the removal of voids by molding.

TABLE 2

| | Example No. | | | | Comparative Example No. | | | | | |
|---|---|---|---|---|---|---|---|---|---|---|
| | 1 | 2 | 3 | 4 | 1 | 2 | 3 | 4 | 5 | 6 |
| Melt viscosity at 60° C. before curing (× $10^6$ P) | 4.3 | 4.0 | 3.9 | 3.7 | 6.5 | 6.1 | 3.2 | 2.8 | 4.7 | 4.2 |
| Melt viscosity at 120° C. before curing (× $10^6$ P) | 3.0 | 2.5 | 2.4 | 2.0 | 4.5 | 4.2 | 1.9 | 1.6 | 3.5 | 2.6 |
| Elastic modulus at 0° C. before curing (MPa) | 2368 | 2215 | 2139 | 2054 | 3061 | 2853 | 1464 | 1341 | 2479 | 2375 |
| Elastic modulus at 175° C. after curing (MPa) | 2.2 | 2 | 1.7 | 1.5 | 5.6 | 5.5 | 1 | 0.8 | 3.5 | 2.5 |
| Adhesive strength (kgf/chip) | 12 | 12 | 12 | 12 | 13 | 13 | 5 | 4 | 12 | 11 |
| Low-temperature divisibility at 0° C. | ○ | ○ | ○ | ○ | ○ | ○ | x | x | ○ | ○ |
| Removal of attach voids* | ○ | ○ | ○ | ○ | x | x | ○ | ○ | Δ | Δ |
| Removal of molding voids* | ○ | ○ | ○ | ○ | x | x | ○ | ○ | Δ | ○ |

*○: Area occupied by voids <5%,
x: Area occupied by voids >30%,
Δ: 5% ≤ Area occupied by voids ≤30%

As can be seen from the results in Table 2, the adhesive films of Examples 1 and 2, each of which included the polymer resin having a $T_g$ of 16° C. and the liquid epoxy resin, and the adhesive films of Examples 3 and 4, each of which included the polymer resin having a $T_g$ of 16° C. and the liquid epoxy resin, exhibited excellent characteristics in terms of void removal, adhesive strength, and low-temperature divisibility.

The adhesive films of Examples 1-4 exhibited adhesive strengths higher than 10 kgf. In contrast, the adhesive films of Comparative Examples 3 and 4, each of which included the polymer resin whose $T_g$ was 0° C., exhibited very low strengths. The flowability of the adhesive increased with decreasing $T_g$ of the polymer resin, resulting in good embedding in the substrate and improved ability of the adhesive to remove voids. However, the heat resistance of the adhesive was deteriorated with decreasing $T_g$ of the polymer resin, resulting in low adhesive strength at high temperature or low reliability.

Including the polymer resin having a low $T_g$ resulted in a relatively low elastic modulus of the adhesive film and resulted in poor low-temperature divisibility of the adhesive film. In contrast, the use of the polymer resin having a high $T_g$, as in the adhesive films of Comparative Examples 1 and 2, resulted in improvements in the adhesive strength or reliability of the adhesive and good low-temperature divisibility, but deteriorated the ability to remove voids. The viscosity and elastic modulus of the adhesive before and after curing increased with increasing $T_g$ of the polymer resin. The increased viscosity and elastic modulus resulted in poor flowability of the adhesive, deteriorating the embedding of the adhesive in the substrate and the underlying wafer and the ability of the adhesive to remove voids. These results exhibit the advantages of using the polymer resin having a $T_g$ within the appropriate range.

It was observed that the adhesive films of Examples 1-4 and Comparative Examples 1-4, each of which included the liquid epoxy resin, exhibited relatively low viscosity values and elastic modulus values before and after curing. From these observations, it can be concluded that the controlled viscosity values of the adhesive films by the use of the liquid epoxy resin within the appropriate content range were very effective in improving the ability to remove voids without any significant change in adhesive strength and elastic modulus.

The adhesive films of Comparative Examples 5 and 6, none of which included a liquid epoxy resin, unlike the adhesive films of Examples 1-4, exhibited high adhesive strength and good low-temperature divisibility comparable to the adhesive films of Examples 1-4, but they exhibited inferior void removal ability relative to the adhesive films of Examples 1-4.

The liquid epoxy resin included in an amount of about 30% with respect to the total weight of the epoxy resins (Examples 1 and 3) very effectively enhanced the ability to remove voids. Without being bound by theory, the reason for this may be that addition of the liquid epoxy resin resulted in a sharp reduction in the viscosity of the adhesive with increasing temperature from around room temperature, which made the adhesive highly embeddable in the substrate during die attach to improve the ability of the adhesive to remove voids. The presence of fewer voids during attach eliminated the need to additionally remove voids by molding, which contributed to an improvement in reliability. The beneficial effects of the liquid epoxy resin may be achieved when the polymer resin has a $T_g$ within the range of an embodiment, e.g., about 5° C. to about 35° C. The effects of the liquid epoxy resin were not exhibited at too high a $T_g$ of the polymer resin. Meanwhile, too low a $T_g$ of the polymer resin did not lead to a sufficient reduction in the viscosity of the adhesive despite the use of the liquid epoxy resin.

By way of summation and review, a dicing film may be produced by coating a general or UV curable pressure-sensitive adhesive on a polyvinyl chloride or polyolefin film as a base film and adhering a cover film made of PET thereto. A general adhesive film for semiconductor assembly may be attached to a semiconductor wafer. Then, a dicing film, from which a cover film may be previously removed, may be overlaid on the adhesive film, followed by dicing to cut the resulting wafer structure into pieces.

In a dicing process for semiconductor assembly, an adhesive for dicing die bonding may be used to laminate an adhesive film to a dicing film, after removal of a PET cover film. Then, a semiconductor wafer may be attached to the adhesive film; and the resulting wafer structure may be cut into pieces by dicing. A diamond blade may be used as a cutting tool for dicing.

However, adhesive films made of soft organic materials may be relatively difficult to individualize, compared to the wafers made of hard inorganic materials. Thus, inorganic fillers or polymer resins having a high glass transition temperature ($T_g$) may be added to the adhesive films.

Although the addition of inorganic fillers and the use of polymer resins having a high glass transition temperature may increase a low-temperature elastic modulus of adhesive films to thereby facilitate individualization of the adhesive films at low temperature, they may deteriorate high-temperature flowability of the films and may increase the elastic modulus of the films after curing, thereby causing difficulties in embedding of the adhesive compositions in substrate irregularities and removing bubbles after wafer attachment. As a consequence, adhesion reliability of the adhesive compositions may be deteriorated.

The embodiments provide an adhesive composition for stealth dicing of a semiconductor that includes a polymer resin having a particular glass transition temperature ($T_g$) and a liquid epoxy resin to prepare an adhesive that facilitates low-temperature individualization and easy cutting and ensures good embedding in a substrate and high adhesion reliability.

The embodiments provide an adhesive composition for stealth dicing of a semiconductor that uses and a liquid epoxy resin as well as a polymer resin having a glass transition temperature ($T_g$) within a particular range to prepare an adhesive having increased low-temperature elastic modulus before curing and decreased high-temperature elastic modulus after curing. The increased low-temperature elastic modulus before curing may help ensure low-temperature individualization and easy cutting. The decreased high-temperature elastic modulus after curing may help ensure good embedding in a substrate and high adhesion reliability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An adhesive composition for stealth dicing of a semiconductor, the adhesive composition comprising:
   about 100 parts by weight of a polymer resin, the polymer resin having a glass transition temperature of about 5° C. to about 35° C.,
   about 1 to about 20 parts by weight of an epoxy resin, the epoxy resin including a liquid epoxy resin and a solid epoxy resin,
   about 1 to about 20 parts by weight of a phenolic resin curing agent
   about 10 to about 80 parts by weight of an inorganic filler,
   about 0.1 to about 20 parts by weight of a curing catalyst, and
   about 0.1 to about 10 parts by weight of a silane coupling agent,
   wherein the adhesive composition provides an adhesive having an elastic modulus at 0° C. of about 1,500 to about 2,500 MPa before curing and an elastic modulus at 175° C. of about 1.5 to about 2.5 MPa after curing.

2. The adhesive composition as claimed in claim 1, wherein the liquid epoxy resin is present in an amount of about 5 to about 40% by weight, based on a total weight of the epoxy resin.

3. The adhesive composition as claimed in claim 1, wherein the polymer resin has a weight average molecular weight of about 50,000 to about 5,000,000 g/mol.

4. The adhesive composition as claimed in claim 1, wherein the polymer resin includes at least one of a polyester resin, a polyamide resin, a butadiene rubber, an acrylic rubber, a (meth)acrylate resin, a urethane resin, a polyphenylene ether resin, a polyetherimide resin, a phenoxy resin, a modified polyphenylene ether resin, and a (meth)acrylate copolymer containing epoxy groups.

5. The adhesive composition as claimed in claim 1, wherein the liquid epoxy resin includes at least one of a bisphenol A epoxy resin, a bisphenol F epoxy resin, a tri- or higher functional epoxy resin, a rubber modified epoxy resin, a urethane modified epoxy resin, an acrylic modified epoxy resin, and a photosensitive epoxy resin.

6. The adhesive composition as claimed in claim 1, wherein the solid epoxy resin includes at least one of a bisphenol epoxy resin, a phenol novolac epoxy resin, an o-cresol novolac epoxy resin, a polyfunctional epoxy resin, an amino epoxy resin, a heterocyclic ring-containing epoxy resin, a substituted epoxy resin, a naphthol epoxy resin, and derivatives thereof.

7. The adhesive composition as claimed in claim 1, wherein the phenolic resin curing agent includes at least one of bisphenol resins, phenol novolac resins, bisphenol A novolac resins, phenolic resins, and mixtures thereof.

8. The adhesive composition as claimed in claim 1, wherein the inorganic filler includes at least one of gold powder, silver powder, copper powder, nickel, alumina, aluminum hydroxide, magnesium hydroxide, calcium carbonate, magnesium carbonate, calcium silicate, magnesium silicate, calcium oxide, magnesium oxide, aluminum nitride, silica, boron nitride, titanium dioxide, a glass, iron oxide, and a ceramic.

9. The adhesive composition as claimed in claim 1, wherein the curing catalyst includes at least one of a melamine catalyst, an imidazole catalyst, and a triphenylphosphine catalyst.

10. The adhesive composition as claimed in claim 1, wherein the silane coupling agent includes at least one of:
an epoxy-containing silane including at least one of 2-(3, 4-epoxycyclohexyl)ethyltrimethoxysilane, 3-glycidoxytrimethoxysilane, and 3-glycidoxypropyltriethoxysilane;
an amine-containing silane including at least one of N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, and N-phenyl-3-aminopropyltrimethoxysilane;
a mercapto-containing silane including at least one of 3-mercaptopropylmethyldimethoxysilane and 3-mercaptopropyltriethoxysilane; and
an isocyanate-containing silane including 3-isocyanatopropyltriethoxysilane.

11. The adhesive composition as claimed in claim 1, further comprising about 20 to about 500 parts by weight of an organic solvent, based on 100 parts by weight of the polymer resin.

12. The adhesive composition as claimed in claim 1, further comprising about 0.01 to about 10 parts by weight of at least one ion scavenger, based on 100 parts by weight of the polymer resin, the ion scavenger including at least one of a triazine thiol compound, a zirconium compound, an antimony bismuth compound, and a magnesium aluminum compound.

13. The adhesive composition as claimed in claim 1, wherein:
the liquid epoxy resin has a melting point of about −70° C. to about 0° C., and the solid epoxy resin has a softening point of about 30° C. to about 100° C.

14. An adhesive film for stealth dicing of a semiconductor formed from the adhesive composition as claimed in claim 1.

15. A semiconductor device comprising the adhesive film as claimed in claim 14 adhered to a silicon wafer.

16. The semiconductor device as claimed in claim 15, wherein less than about 5% of an area of the adhesive film is covered by attach voids or molding voids.

* * * * *